US007352082B2

(12) United States Patent
Marwali et al.

(10) Patent No.: US 7,352,082 B2
(45) Date of Patent: *Apr. 1, 2008

(54) TRANSFER SWITCH DEVICE AND METHOD

(75) Inventors: Mohammad N Marwali, Lewis Center, OH (US); Terry D Bush, Westerville, OH (US); Brian Heber, Delaware, OH (US); Jeffery Powell, Lewis Center, OH (US)

(73) Assignee: Liebert Corporation, Columbus, OH (US)

( * ) Notice: Subject to any disclaimer, the term of this patent is extended or adjusted under 35 U.S.C. 154(b) by 330 days.

This patent is subject to a terminal disclaimer.

(21) Appl. No.: 10/904,441

(22) Filed: Nov. 10, 2004

(65) Prior Publication Data
US 2005/0184591 A1    Aug. 25, 2005

Related U.S. Application Data

(60) Provisional application No. 60/521,045, filed on Feb. 10, 2004.

(51) Int. Cl.
*H02J 1/10* (2006.01)
*H02J 3/38* (2006.01)
*H02J 7/34* (2006.01)

(52) U.S. Cl. .................................................... 307/52
(58) Field of Classification Search ............. 307/52, 307/144
See application file for complete search history.

(56) References Cited

U.S. PATENT DOCUMENTS

| 4,256,972 | A |  | 3/1981 | Wyatt et al. ................ 307/68 |
| 5,210,685 | A |  | 5/1993 | Rosa et al. ................. 363/109 |
| 5,502,340 | A |  | 3/1996 | Schuster et al. ............. 307/87 |
| 5,670,833 | A | * | 9/1997 | Mengelt et al. .............. 307/66 |
| 5,784,240 | A |  | 7/1998 | Przywozny et al. .......... 361/85 |
| 5,808,378 | A |  | 9/1998 | O'Leary et al. .............. 307/87 |
| 6,969,976 | B1 | * | 11/2005 | Broach et al. .............. 323/222 |
| 2005/0184592 | A1 | * | 8/2005 | Marwali et al. ............. 307/52 |

OTHER PUBLICATIONS

Mokhtari, H., et al.: "Performance evaluation of thyristor based static transfer switch", IEEE Transactions on Power Delivery IEEE USA, vol. 15, No. 3, Jul. 2000, pp. 960-966.
PCT International Search Report for International Application No. PCT/US2005/004155 dated Jun. 17, 2005.
PCT Written Opinion of the International Searching Authority for International Application No. PCT/US2005/004155 dated Jun. 17, 2005.

* cited by examiner

*Primary Examiner*—Michael Sherry
*Assistant Examiner*—Carlos Amaya
(74) *Attorney, Agent, or Firm*—Locke Lord Bissell & Liddell LLP

(57) ABSTRACT

This disclosure is concerned with devices and methods for voltage source transfer switching that reduces or eliminates transformer saturation due to DC flux built up during a transfer event. First and second voltage sources (primary and alternate) are connectable to a load via corresponding switches. A transformer is connected downstream of the switches. A controller operates the switches according to various transfer methods wherein a switching time is determined to minimize downstream saturation current.

6 Claims, 4 Drawing Sheets

TRANSFER SWITCH DEVICE AND METHOD

CROSS-REFERENCE TO RELATED APPLICATION

This application claims the benefit of U.S. Provisional Application Ser. No. 60/521,045, filed Feb. 10, 2004, which is incorporated by reference. This application is related to U.S. Pat. No. 10/904,443, "STATIC TRANSFER SWITCH DEVICE AND METHOD," filed on the same day as the present application and incorporated by reference.

BACKGROUND

The present invention relates generally to voltage transfer switches, and more particularly, to AC voltage source transfer methods for switch systems having a transformer downstream of the transfer switch.

Voltage transfer switches are commonly used to switch between a primary and one or more alternate power sources in the event of failure or instability of the primary source. Such transfer switches are commonly used in applications that require continuity of power, such as in hospitals and critical processes in both industrial and commercial settings. For example, in a power system having a primary voltage source and one alternate voltage source, fist and second switches are associated with the primary and alternate voltage sources, respectively. The switches are activated by a controller, such that upon a failure of the primary source, the first switch is opened to remove the primary voltage source from a load and the second switch is subsequently closed to connect the alternate source to the load, hence maintaining power to the load.

Generally, the second switch is turned on as soon as possible after the load is disconnected from the primary source in an attempt to minimize the voltage disruption at the load side. However, in systems having a transformer connected downstream of the switches, this can cause a problem when the two sources are not initially synchronized, since the transformer would saturate due to the dc flux built up during the transfer event. The transformer saturations are highly undesirable since they can cause large saturation currents to flow, which in turn can cause system failure due to source overloading or upstream protective breakers tripping.

The present application addresses these shortcomings associated with the prior art.

SUMMARY

This disclosure is concerned with devices and methods for voltage source transfer switching that reduces or eliminates transformer saturation due to DC flux built up during a transfer event. First and second voltage sources (primary and alternate) are connectable to a load via corresponding switches. A transformer is connected downstream of the switches. A controller operates the switches according to various transfer methods to minimize downstream saturation current. One method includes computing the volt-seconds area of the load and alternate voltages in real time. Prior to and during the primary source failure, the controller continuously computes the target volt-seconds value, i.e., the area under the load voltage curve, and it computes a compensating area on the alternate source voltage curve. When a transfer is initiated, the controller waits until the target volt-second area is approximately equal to or complements the compensating volt-second area before it turns on the appropriate switch to connect the alternate source to the load.

In another transfer method, two flux quantities are computed continuously prior to a transfer event. The first flux corresponds to the flux that is generated by the load voltage when it drives the transformer, and the second corresponds to an imaginary flux that would be generated by the alternate source if it were driving the transformer. Upon a primary source failure, the controller transfers the load to the alternate source when the two flux quantities are equal.

BRIEF DESCRIPTION OF THE DRAWINGS

Other objects and advantages of the invention will become apparent upon reading the following detailed description and upon reference to the drawings in which.

Figure 1:
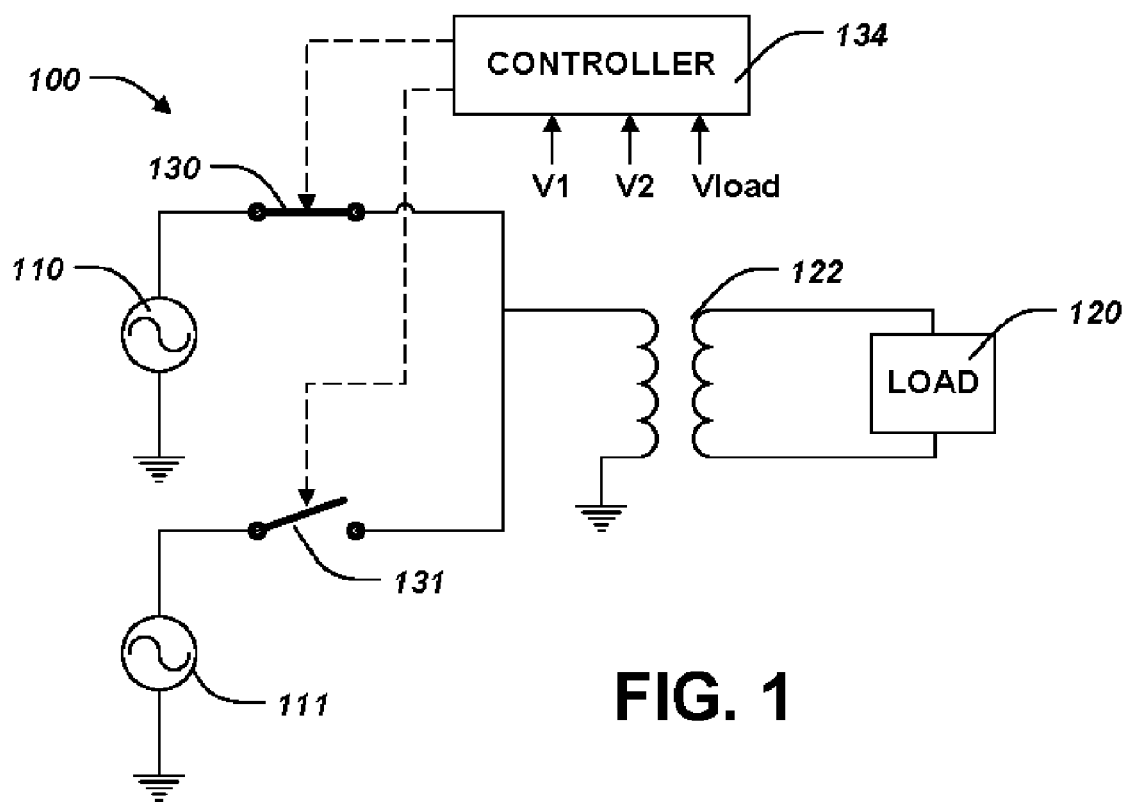
FIG. 1 is a block diagram of an AC voltage transfer system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates an uninterruptible power supply system including an AC voltage transfer switch system 100. The transfer switch system 100 includes a first, or primary, voltage source 110 and a second, or alternate voltage source 111. The first and second voltage sources 110, 111 are connected to a load 120 via a transformer 122. First and second switches 130, 131 are connected to the first and second voltage sources 110, 111, respectively, and a controller 134 activates the switches 130, 131. Devices suitable for the switches 130, 131 include SCRs, IGBTs, Triacs, etc. The controller 134 may comprise, for example, a digital signal processor (DSP) or any suitable programmable logic device. The controller 134 receives the voltage levels of the first and second voltage sources V1 and V2, and the load voltage Vload as inputs. The load voltage Vload here is defined as the output voltage of the transfer switch applied to the transformer primary.

Under normal conditions, the first switch 130 is closed as shown in FIG. 1, connecting the first source 110 (primary source) to the load 120. In the event that the first source 110 fails while the second source 111 (alternate source) is available, the controller 134 detects the condition, and turns off the first switch 130 and subsequently turns on the second switch 131, maintaining power to the load 120.

In known transfer switch systems, the second switch 131 is typically turned on as soon as possible after the load 120 is disconnected from the first voltage source 110 in an attempt to minimize the voltage disruption at the load 120. If the two sources 110, 111 are not initially synchronized, the transformer 122 will saturate due to the DC flux built up during the transfer event. The transformer saturations are highly undesirable since they can cause large saturation currents to flow, which in turn can cause system failure due to source overloading or upstream protective breakers tripping.

Figure 2A:
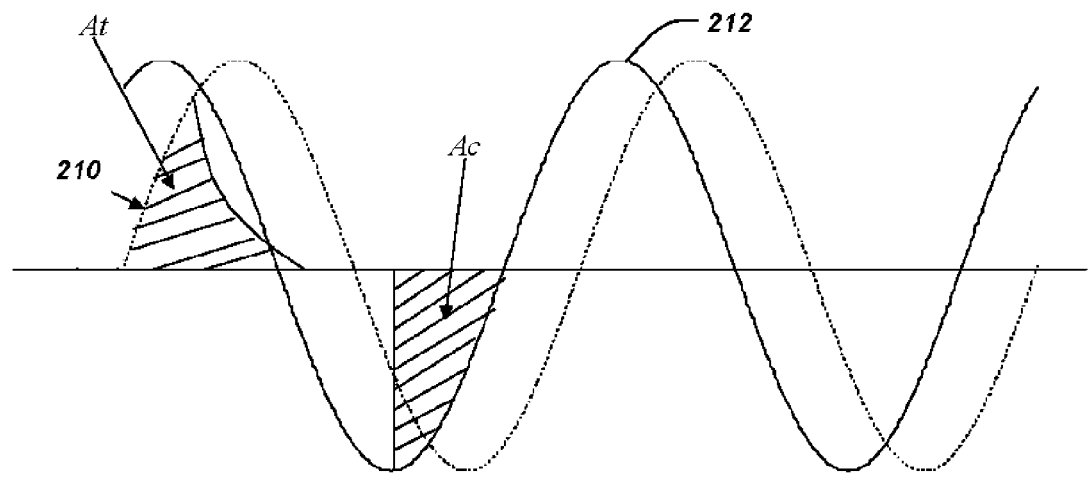
FIGS. 2A and 2B illustrate two sets of voltage waveforms showing balanced voltage conditions.
Figure 2B:
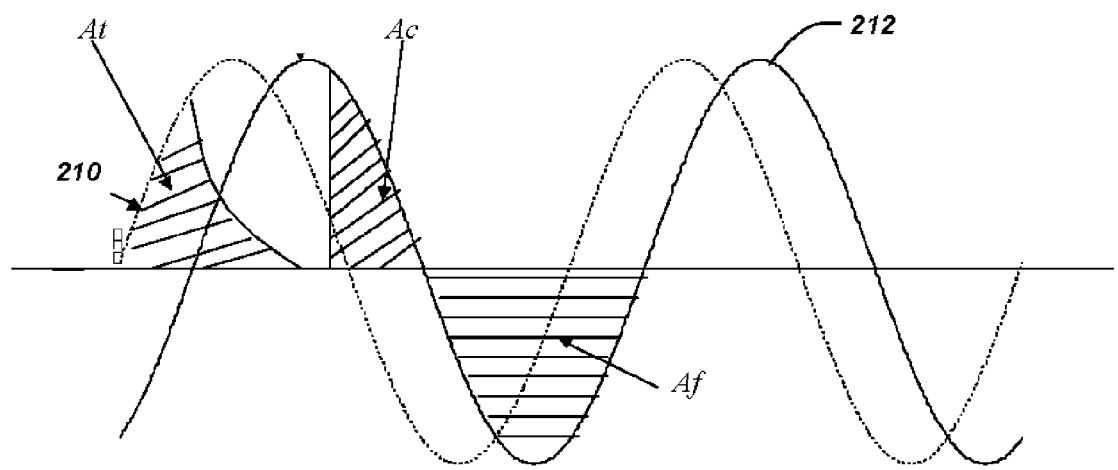

To avoid transformer saturation, the optimum time to transfer from the first source 110 to the second source 111 is determined. In one embodiment, the transfer time is determined by computing the volt-seconds area of the load and alternate voltages. FIGS. 2A and 2B show waveforms for the load voltage 210 and alternate voltage 212. When the primary source 110 fails, the controller 134 keeps track of the amount of volt-seconds, i.e., the area under the load voltage curve 210 (At) from the time of the last zero-cross until the first switch 130 is turned off, and it computes a compensating area for the alternate source curve 212 (Ac). Polarity is assigned to each volt-seconds area based on the polarity of the corresponding voltage, for example a positive polarity is assigned to the area under the positive voltage and a negative polarity is assigned to the area under the negative voltage. When a transfer is initiated, the controller 134 waits until the target volt-sec area is approximately equal to (as in FIG. 2A) or complements (as in FIG. 2B) the compensating volt-sec area before it turns on the second switch 131. This results in little or no dc flux built up in the transformer 122 during transfer.

FIGS. 2A and 2B illustrate two different balanced conditions for transferring from the first to the second voltage source. In FIG. 2A, At and Ac have different signs (At·Ac<0). In FIG. 2B, At and Ac have the same sign (At·Ac>0). As noted above, At is the target volt-second area of the load voltage, and Ac is the compensating volt-second area of the alternate voltage. FIG. 2B also includes Af, which represents the full half-cycle volt-second area of the alternate voltage. The quantity Ac involves an event that occurs in the future (after the transfer occurs), and therefore can not be exactly determined. However, assuming that the alternate voltage 212 does not change considerably from the previous cycle before the transfer, the quantity Ac at any given time t can be approximated from Ac(t)=Af−Ar(t), where Af is the previous full half-cycle volt-second area, and Ar is the running integral of the volt-sec area from zero-cross to time t.

Thus, to avoid transfer saturations, in the situation shown in FIG. 2A, the controller 134 operates the switches 110, 111 such that the absolute values of At and Ac are equal (|At|=|Ac|). Defining quantity S1 as S1=At+Ac, the controller 134 turns on the second switch 111 so that S1=0 when (At·Ac<0).

Referring now to FIG. 2B, the controller 134 operates the switches 110, 111 such that the quantities At and Ac added together equal a full half-cycle volt-second area of the alternate voltage (At+Ac=Af). Defining quantity 52 as S2=At+Ac−Af, the controller 134 turns on the second switch 111 so that S2=0 when (At·Ac>0).

Figures 3, 5:
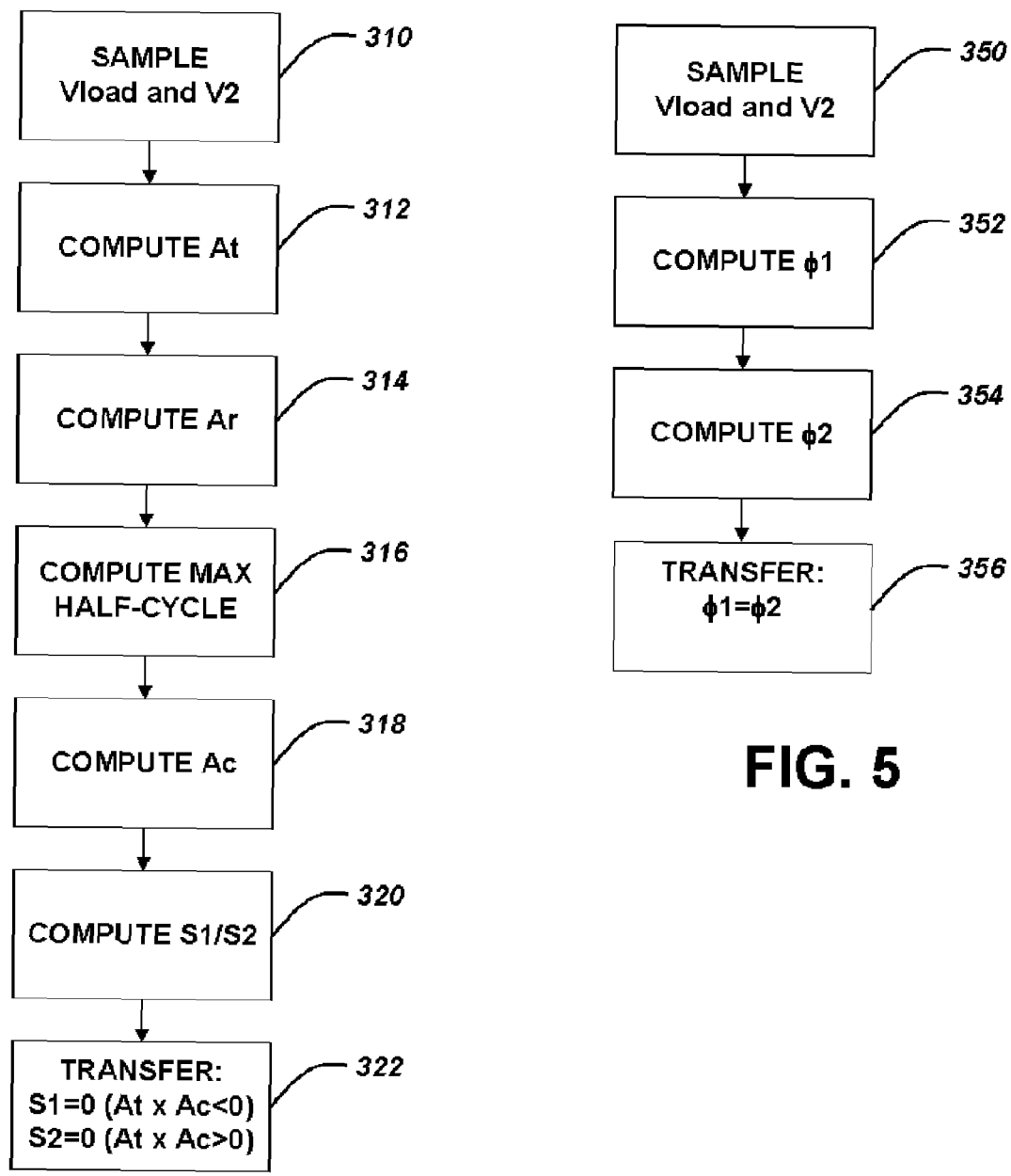
FIG. 3 is a flow diagram of a transfer method disclosed herein.
FIG. 5 is a flow diagram of another transfer method disclosed herein.

FIG. 3 is a flow diagram illustrating a specific implementation of the volt-second area method for transferring from the first voltage source 110 to the second voltage source 111. In block 310, the load voltage Vload(k) and the alternate voltage V2(k) are sampled at a predetermined sample rate, for example, 15 kHz. The target volt-sec area At is calculated in block 312 by integrating the load voltage Vload At(k+1)=At(k)+Vload(k). At each zero-cross of the load voltage Vload, the target volt-second area At(K) is reset, except after a command to transfer occurs. In block 314, the running alternate volt-sec area Ar(k) is calculated by integrating the alternate voltage V2: Ar(k+1)=Ar(k)+Valt(k). The running volt-sec area Ar(k) is also reset to zero at every zero-cross of the alternate voltage V2, except after a command to transfer occurs.

In block 316, the maximum half-cycle volt-second area is calculated by latching the value of Ar(k) at every zero-cross, before resetting Ar(k). The compensating volt-sec area Ac(k) is calculated in block 318 based on the difference between the previous half-cycle volt-second area Af and the the running integral of the volt-sec area Ar. Ac(k)=Af−Ar(k). In block 320, the S1 and S2 values are calculated: S1(k)=At(k)+Ac(k) and S2(k)=At(k)+Ac(k)−Af. In block 322, the controller 134 performs the transfer when S1(k)=0 (At·Ac<0) or when S2(k)=0 (At·Ac>0).

In another embodiment, two flux quantities are computed continuously prior to a transfer event. The first flux corresponds to the flux that is generated by the load voltage Vload when it drives the transformer 122, and the second flux corresponds to an imaginary flux that would be generated by the second voltage source 111, if it were driving the transformer 122. It can be shown that the optimum transfer point is achieved when these two flux quantities are equal.

Figure 4A:
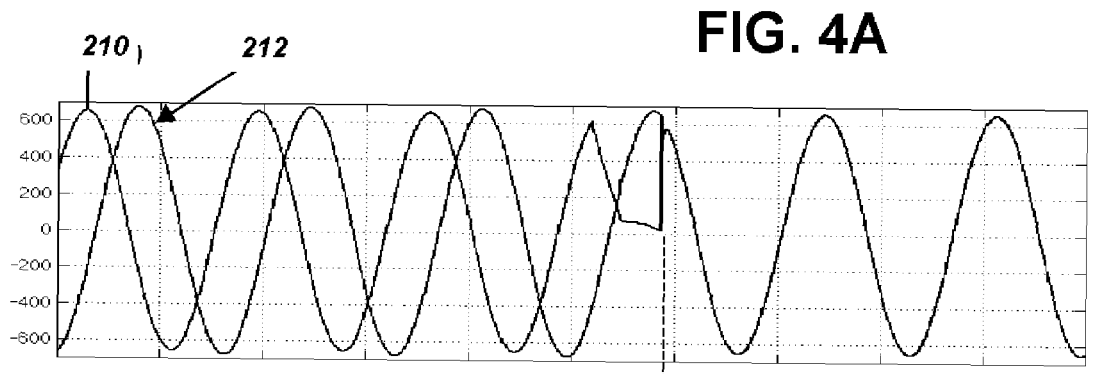
FIGS. 4A and 4B illustrate two voltage waveforms and corresponding flux waveforms.
Figure 4B:
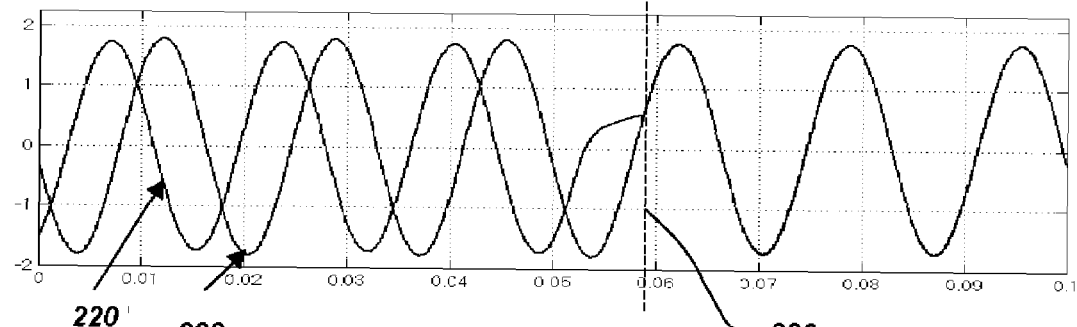

FIG. 4 shows two sets waveforms for the load voltage Vload and alternate voltage V2. The top waveforms are voltage curves for load voltage 210 and alternate voltage 212, and the bottom waveforms are the corresponding flux curves for the load voltage 220 and alternate voltage 222. The controller 134 performs the transfer when the fluxes are equal—shown by the broken line 230.

Ignoring the effect of leakage impedance of the transformer 122, the fluxes built up on the transformer 122 due to the application of the first voltage source 110 and the second voltage source 111 satisfy the following differential equations:

$$\frac{d\phi_1(t)}{dt} \approx V_1(t)$$

$$\frac{d\phi_2}{dt}(t) \approx V_2(t)$$

where $V_1(t)$ and $V_2(t)$ are the first and second source voltages and $\phi_1(t)$, $\phi_2(t)$ are the fluxes corresponding to each voltage.

The fluxes $\phi_1(t)$, $\phi_2(t)$ can be computed by solving the above differential equations at any given time:

$$\phi_1(t) = \int V_1(t)dt$$

$$\phi_2(t) = \int V_2(t)dt$$

In the generalized flux method, the optimum transfer is achieved when the two flux quantities defined above are equal in values: $\phi_1(t)=\phi_2(t)$.

FIG. 5 is a flow diagram illustrating a specific implementation of the generalized flux method for transferring from the first voltage source 110 to the second voltage source 111. In block 350, the output voltage Vload(k) and the alternate voltage Valt(k) are sampled at a predetermined sample rate, for example 15 kHz. In blocks 352 and 354, the load and alternate fluxes $\phi_1$, $\phi_2$ are determined by integrating the load and alternate voltages, respectively: $\phi_{load}(k+1)=\phi_{load}(k)+V_{load}(k)$; $\phi_{alt}(k+1)=\phi_{alt}(k)+V_{alt}(k)$ The DC component is removed from both flux quantities periodically prior to transfer using any known techniques. In block 356, the transfer is performed when the flux quantities are equal: $\phi_{load}(k)=\phi_{alt}(k)$.

Rather than balancing the volt-second area or fluxes to be exactly equal, as discussed above, some error tolerance can be used in the balanced condition to provide a trade off between reduced transfer time and some amount of transformer saturation current. Denoting the tolerance as zcth, the balanced conditions above can be rewritten as follows:

Volt-second area method where At·Ac<0: $|S1|=|At+Ac|\leq zcth$; and where At·Ac>0: $|S2|=|At+Ac-Af|\leq zcth$.

For the generalized flux method: $|\phi_1-\phi_2|\leq zcth$.

The methods described above use volt-second area and flux information that are computed continuously online. In these methods, the optimum switching times for transferring to the alternate source are not known until conditions that guarantee the minimization or elimination of the transformer saturation occur in real time. Known approaches determine optimum switching time based on offline voltage waveform analysis. Such methods, for example, may include determination of optimum switching time delay based on the last known measured phase angle difference between the two sources. In this case, the relationship between the optimum switching delay and the sources phase difference is first derived offline by imposing certain assumptions on the voltage waveforms during the transfer event. Clearly, this approach limits the effectiveness of the method when the actual voltage waveform during transfer deviates from the assumed shape. The methods disclosed herein, on the other hand, do not posses this drawback since the volt-second area and fluxes are continuously computed online based on actual real time voltage waveforms during transfer events.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. It should also be evident that the exemplary embodiments disclosed above may be readily applied to other similar or known power systems where transferring from one source of A/C power to another is necessary, such as a standard UPS system where the first source of power is an A/C voltage inverter and the second source of power is the utility or an A/C voltage generator. Consequently, all such similar applications are considered within the scope and spirit of the invention. Accordingly, the protection sought herein is as set forth in the claims below.

What is claimed is:

1. A method of switching first and second voltage sources, comprising:

disconnecting the first voltage source from a load:

computing in substantially real time volt-second areas from waveforms of the first and second voltage sources;

assigning a polarity to each volt-second area based on the polarity of the corresponding voltage waveform;

determining a switching time based on when absolute values of the volt-second areas of the first and second voltage sources are approximately equal and the polarities are opposite; and connecting the second voltage source to the load at the determined switching time so that downstream saturation current is minimized.

2. A method of switching first and second voltage sources, comprising:

disconnecting the first voltage source from a load;

computing in substantially real time volt-second areas from voltage waveforms of the first and second voltage sources;

assigning a polarity to each volt-second area based on the polarity of the corresponding voltage waveform;

summing absolute values of the volt-second areas under the waveforms of the first and second voltage sources;

determining a switching time when the sum of the absolute values of the volt-second areas of the first and second voltage sources are approximately equal to an absolute value of a volt-second area of a complete half cycle of the second voltage waveform when their polarities are the same; and connecting the second voltage source to the load at the determined switching time.

3. A power source system, comprising:

a first switch connectable to a first voltage source;

a second switch connectable to a second voltage source;

a controller operationally connected to the first and second switches to selectively activate and deactivate the first and second switches to connect the first or the second switch to a load via a transformer;

the controller having inputs for receiving signals representing the voltage levels of the first and second voltage sources and the voltage applied to the load transformer, the controller configured to, upon a predetermined condition:

deactivate the first switch to disconnect the first voltage source from the load, compute substantially in real time volt-second areas under voltage waveforms of the first and second voltage sources, and assign a polarity to each volt-second area based on the polarity of the corresponding voltage waveform;

determine a switching time current based on when absolute values of the areas under the waveforms of the first and second voltage sources are approximately equal and their polarities are opposite; and connect the second voltage source to the load at the determined switching time to minimize downstream saturation.

4. A transfer switch system, comprising:

a first switch connectable to a first voltage source;

a second switch connectable to a second voltage source;

a controller connected to the first and second switches to activate and deactivate the first and second switches to selectively connect the first or the second switch to a load via a transformer;

the controller having inputs for receiving signals representing the voltage levels of the first and second voltage sources and the voltage applied to the load transformer, wherein upon a predetermined condition, the controller:

deactivates the first switch to disconnect the first voltage source from the load, computes in substantially real time volt-second areas under voltage waveforms of the first and second voltage sources, assigns a polarity to each volt-second area based on the polarity of the corresponding voltage;

determines a switching time to minimize downstream saturation current based on the sum of the absolute values of the areas under the waveforms of the first and second voltage sources being approximately equal to the absolute value of the area under the waveform of a complete half cycle of the second voltage, and their polarities being the same; and connects the second voltage source to the load at the determined switching time.

5. An uninterruptible power supply system, comprising:

a first voltage source;

a second voltage source;

a first switch connected to the first voltage source;

a second switch connected to the second voltage source;

a transformer having an input connected to the first and second switches to selectively connect the transformer to the first or second voltage source, the transformer having output terminals connectable to a load; and a controller connected to the first and second switches to activate and deactivate the first and second switches to selectively connect the first or the second switch to the transformer;

the controller receiving signals representing the voltage levels of the first and second voltage sources and the voltage applied to the transformer input, wherein upon a predetermined condition, the controller:

deactivates the first switch to disconnect the first voltage source from the transformer;

computes volt-second areas under voltage waveforms of the first and second voltage sources in real time;

assigns a polarity to each volt-second area based on the polarity of the corresponding voltage;

determines a switching time to minimize downstream saturation current when the absolute values of the areas under the waveforms of the first and second voltage sources when they are approximately equal and their polarities are opposite; and connects the second voltage source to the transformer at the determined switching time.

6. An uninterruptible power supply system, comprising:

a first voltage source;

a second voltage source;

a first switch connected to the first voltage source;

a second switch connected to the second voltage source;

a transformer having an input connected to the first and second switches to selectively connect the transformer to the first or second voltage source, the transformer having output terminals connectable to a load; and a controller connected to the first and second switches to activate and deactivate the first and second switches to selectively connect the first or the second switch to the transformer;

the controller receiving signals representing the voltage levels of the first and second voltage sources and the voltage applied to the transformer input, wherein upon a predetermined condition, the controller:

deactivates the first switch to disconnect the first voltage source from the transformer; computes volt-second areas under voltage waveforms of the first and second voltage sources in real time;

assigns a polarity to each volt-second area based on the polarity of the corresponding voltage;

determines a switching time to minimize downstream saturation current when the sum of the absolute values of the areas under the waveforms of the first and second voltage sources are approximately equal to the absolute value of the area under the waveform of a complete half cycle of the second voltage, and when their polarities are the same; and connects the second voltage source to the transformer at the determined switching time.

* * * * *

UNITED STATES PATENT AND TRADEMARK OFFICE
CERTIFICATE OF CORRECTION

PATENT NO. : 7,352,082 B2  Page 1 of 1
APPLICATION NO. : 10/904441
DATED : April 1, 2008
INVENTOR(S) : Mohammad N. Marwali et al.

It is certified that error appears in the above-identified patent and that said Letters Patent is hereby corrected as shown below:

Title Page

Under (75) Inventors, please correct the spelling of the inventor's first name as seen below:

Jeffery Powell to -- Jeffrey Powell --.

Signed and Sealed this

Seventeenth Day of February, 2009

JOHN DOLL
*Acting Director of the United States Patent and Trademark Office*